US009101024B2

(12) United States Patent
Battaglia

(10) Patent No.: US 9,101,024 B2
(45) Date of Patent: *Aug. 4, 2015

(54) SMART FET CIRCUIT

(71) Applicant: Phoseon Technology, Inc., Hillsboro, OR (US)

(72) Inventor: Salvatore T. Battaglia, Vancouver, WA (US)

(73) Assignee: Phoseon Technology, Inc., Hillsboro, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/459,245

(22) Filed: Aug. 13, 2014

(65) Prior Publication Data

US 2014/0346974 A1    Nov. 27, 2014

Related U.S. Application Data

(63) Continuation of application No. 13/282,860, filed on Oct. 27, 2011, now Pat. No. 8,823,279.

(51) Int. Cl.
*H05B 33/08*    (2006.01)
(52) U.S. Cl.
CPC ........ *H05B 33/0845* (2013.01); *H05B 33/0809* (2013.01); *H05B 33/0815* (2013.01); *H05B 33/0824* (2013.01)
(58) Field of Classification Search
USPC .......... 315/224, 308, 307, 291, 209 R, 185 R, 315/193
See application file for complete search history.

(56) References Cited

U.S. PATENT DOCUMENTS

| 5,857,767 | A  | 1/1999  | Hochstein      |
| 6,200,134 | B1 | 3/2001  | Kovac et al.   |
| 6,457,823 | B1 | 10/2002 | Cleary et al.  |
| 6,501,084 | B1 | 12/2002 | Sakai et al.   |
| 6,692,250 | B1 | 2/2004  | Decaudin et al.|
| 7,301,288 | B2 | 11/2007 | Green          |
| 7,688,053 | B2 | 3/2010  | Tung et al.    |
| 7,872,430 | B2 | 1/2011  | Roberts et al. |
| 8,203,286 | B2 | 6/2012  | Roberts et al. |

(Continued)

FOREIGN PATENT DOCUMENTS

| DE | 19619154 A1 | 6/1997  |
| DE | 10127171 A1 | 12/2001 |

(Continued)

OTHER PUBLICATIONS

Data Sheet for G*SiC Technology Super Blue LEDs No. C430-CB290-E1200, manufactured by Opto Semiconductors, May 1, 1999, 8 pages.

(Continued)

*Primary Examiner* — David H Vu
(74) *Attorney, Agent, or Firm* — Alleman Hall McCoy Russell & Tuttle LLP

(57) ABSTRACT

A lighting module has at least one array of solid-state lighting elements, a variable resistor having an input of an intensity control voltage for the array of solid-state lighting elements, the variable resistor having an output electrically connected to an input of the array of solid-state lighting elements, and a voltage regulator electrically connected to the output of the variable resistor, the voltage regulator having an output connected to an input of the array of solid-state lighting elements.

15 Claims, 4 Drawing Sheets

(56) References Cited

U.S. PATENT DOCUMENTS

| | | |
|---|---|---|
| 8,823,279 B2 * | 9/2014 | Battaglia .................. 315/291 |
| 2001/0046652 A1 | 11/2001 | Ostler et al. |
| 2002/0187454 A1 | 12/2002 | Melikechi et al. |
| 2003/0043582 A1 | 3/2003 | Chan et al. |
| 2003/0081096 A1 | 5/2003 | Young |
| 2003/0117087 A1 | 6/2003 | Barth et al. |
| 2007/0085489 A1 | 4/2007 | Robinson et al. |
| 2010/0148684 A1 | 6/2010 | Ragonesi et al. |
| 2011/0266962 A1 | 11/2011 | Son et al. |
| 2012/0062133 A1 | 3/2012 | Cubias |

FOREIGN PATENT DOCUMENTS

| | | |
|---|---|---|
| EP | 0879582 A2 | 11/1998 |
| EP | 1158761 A1 | 11/2001 |
| JP | 2003142281 A | 5/2003 |
| KR | 20110091292 A | 8/2011 |
| WO | 9507731 A1 | 3/1995 |
| WO | 0059671 A1 | 10/2000 |
| WO | 0067048 A2 | 11/2000 |
| WO | 0211640 A2 | 2/2002 |
| WO | 0213231 A2 | 2/2002 |
| WO | 03023875 A2 | 3/2003 |

OTHER PUBLICATIONS

Data Sheet for 5.0 mm Blue Series LEDs No. LNG992CFB, manufactured by the Panasonic Corporation, Mar. 2001, 1 page.

Data Sheet for 3.0 mm Blue Series LEDs No. LNG997CKB, manufactured by the Panasonic Corporation, Mar. 2001, 1 page.

Korean Intellectual Property Office, International Search Report of Written Opinion of PCT/US2012/061343, WIPO, Mar. 29, 2013, 10 pages.

Data Sheet for G*SiC Technology Ultraviolet LEDs No. C395-MB290-E0400, manufactured by Cree, Inc., Available as early as Jul. 2001, 2 pages.

* cited by examiner

SMART FET CIRCUIT

CROSS REFERENCE TO RELATED APPLICATIONS

The present application is a continuation of U.S. patent application Ser. No. 13/282,860, filed Oct. 27, 2011, now U.S. Pat. No. 8,823,279, and entitled SMART FET CIRCUIT, the entire contents of which are hereby incorporated by reference for all purposes.

BACKGROUND

Solid-state lighting devices have many uses in industrial applications. Ultraviolet (UV) lighting devices have become fairly common for curing of coatings, including inks, adhesives, preservatives, etc. Solid-state lighting devices typically use less power, cost less and may have easier disposal than current mercury arc lamp devices.

Solid-state lighting devices may consist of laser diodes or light-emitting diodes (LEDs) as examples. The device typically has an array or several arrays arranged to provide light with a particular profile, such as a long, thin light region, or wider and deeper light regions. The individual elements reside in arrays, a lighting device may consist of several arrays, or several arrays arranged in modules, with the lighting device having several modules.

Generally, solid-state lighting devices may receive power from a constant voltage supply. A circuit that allows for continuous adjustment of current drives the solid-state lighting elements in the device. In some instances, this circuit may include one or more field-effect transistors or other devices that act as variable resistors. A variable voltage drop exists across these devices, resulting in a varying voltage to the array of solid-state light elements. The intensity of the light output of these devices depends upon the current driving them, so any variation in the current causes variation in the light output, an undesirable characteristic.

Current approaches do not account for the power dissipation by the variable resistors. The variable resistors operate in a circuit to continuously adjust current. As the forward voltage increases, the voltage drop across the variable resistor increases, as does the power dissipation. This makes the circuit less efficient.

In addition, the power dissipation in the variable resistors generates heat. Heat management of the variable resistors may require heat sinks, or the variable resistors themselves may have to be large and bulky.

DETAILED DESCRIPTION OF THE EMBODIMENTS

Figures 1, 2:
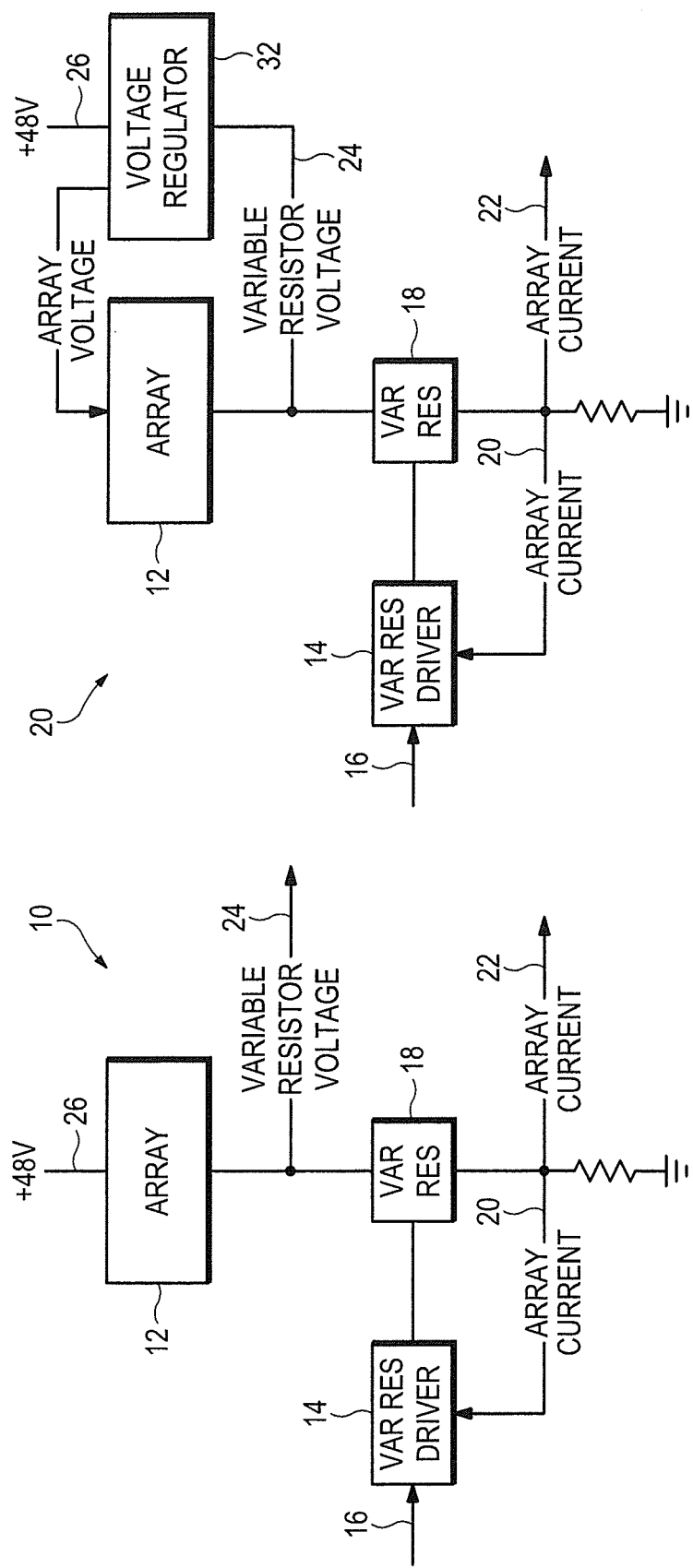
FIG. 1 shows a prior art embodiment of a driving circuit for a solid state lighting device.
FIG. 2 shows an embodiment of a driving circuit for a solid state lighting device.

FIG. 1 shows a current embodiment of a driving circuit 10 for a solid state lighting device. In this embodiment, a variable resistor in the form of a field-effect transistor (FET) receives an intensity signal voltage. While embodiment here will discuss the variable resistor as an FET, one must note that the circuit may employ other forms of variable resistors.

In this embodiment, at least one array of solid-state light-emitting elements such as light-emitting diodes (LEDs) or laser diodes produce light. The elements may be configured as a single array on a substrate, multiple arrays on a substrate, several arrays either single or multiple on several substrates connected together, etc. In one embodiment, the array of light-emitting elements may consist of a Silicon Light Matrix™ (SLM) manufactured by Phoseon Technology, Inc.

The variable resistor driving circuit 14 receives an intensity voltage signal 16 that drives the desired current to the array 12. Generally, the power supply 26 is a constant voltage power supply and the driver circuit 14 and the variable resistor 18 provide continuous adjustment of current 22. The current may return to the variable resistor along feedback path 20. The array 12 also receives the voltage of the variable resistor 24. This circuit is an open loop system from the perspective of the variable resistor voltage.

This design has some issues. For example, the array receives power from the constant voltage power supply, as mentioned above, driven by a circuit that allows for continuous adjustment of current. The power dissipated by the variable resistor depends upon the forward voltage of the array, the array itself and the current at any given time. The voltage drop across the variable resistor equals $V_{power} - V_{forward}$, where $V_{forward}$ is the forward voltage of the array being driven. As this difference increases the power dissipation in the variable resistor increases, resulting in a higher inefficiency for the lighting device.

As an example, the variable resistor voltage may vary in the range from 1 to 8 volts, depending upon the needs of the different arrays of light emitting elements. Driving 2 amps through the array would then cause power dissipation variations from 2 watts to 16 watts. This results in inefficiencies in the lighting device.

In addition, the variable resistor generates heat. In the embodiments where the variable resistor consists of an FET, the heat management issues require large and bulky FETs. The device may also employ a heat sink for heat management, and the extra heat generated by the FET requires a larger and bulkier heat sink than a smaller FET would require.

In contrast to the open loop circuit of FIG. 1, FIG. 2 shows a closed loop circuit 30. In circuit 30, similar to the circuit 10 of FIG. 1, the variable resistor 18 receives intensity voltage control signal 16. The variable resistor then receives its drive signal, producing current 22 that feeds back along path 20. The voltage from the variable resistor 24 does not go to the array 12 in this embodiment. Instead, the voltage feedback 24 goes to a voltage regulator 32. The voltage regulator 32 then outputs a signal to the array 12 and to the error amplifier 42. In this embodiment, the variable resistor takes the form of an FET, but other options could be used such as a bipolar transistor, a digital potentiometer or any electrically controllable, current limiting device. The drive circuit would take different forms depending upon the variable resistor used.

Using a closed loop system, the voltage output of the regulator 32 remains about 0.5 V above what the array requires. This voltage allows the variable resistor to regulate the array current at any desired level. The lower power dissipation increase the efficiency of the circuit, as well as reducing the heat generated when compared to current approaches.

Figure 3:
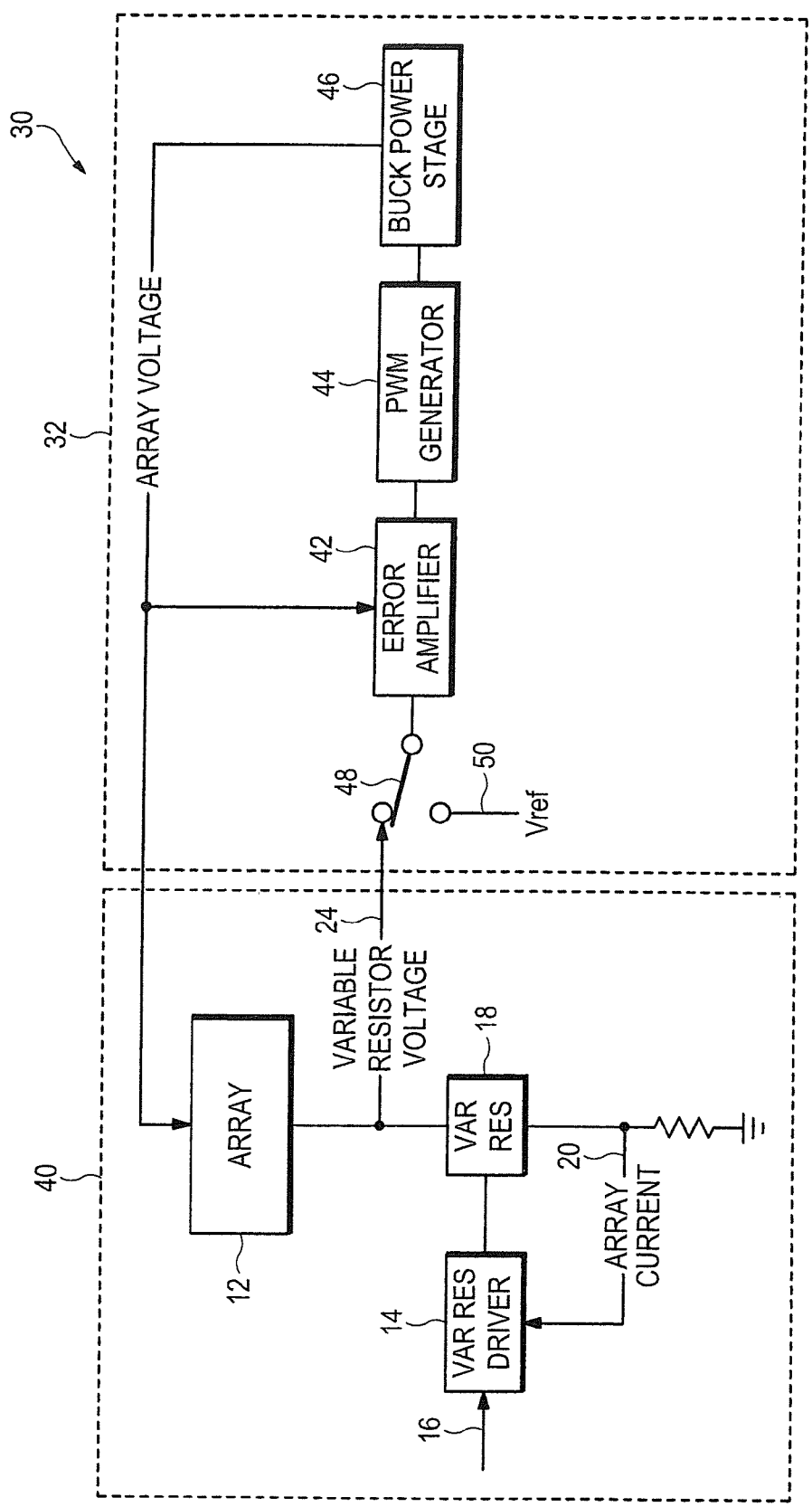
FIG. 3 shows an embodiment of a driving circuit for a solid state lighting device having a regulator stage.

FIG. 3 shows a more detailed embodiment of the circuit 30, with the voltage regulator 32 consisting of a buck regulator circuit. For ease of reference, the figure separates the array stage 40 from the regulator 32. The array stage 40 includes the variable resistor driver 14 with the intensity control signal 16 and the current feedback path 20, the variable resistor 18, and the array 12.

In this embodiment, the voltage regulator 32 consists of a buck regulator stage. The buck regulator has an error amplifier 42, a pulse width modulation generator 44 and a power stage or circuit 46. The error amplifier 42 receives as a first input the output 24 of the variable resistor. This input may be received through a switch and/or delay 48.

The switch 48 allows the circuit to receive a signal indicating the status of the array. If the array of light-emitting elements is enabled, the switch provides the output 24 of the variable resistor to the error amplifier 42. When the array is not enabled, the switch 48 connects the input of the error amplifier to a reference voltage 50. This results in the error amplifier only receiving the output of the buck power stage.

The switch 48 may include a delay that delays the error amplifier in receiving the output of the variable resistor. This allows the current in the array 12 to rise before monitoring the voltage of the variable resistor. This prevents an elevated voltage reading on the variable resistor, which can typically be approximately 16 V when the array is off, from causing a drastic drop in the output of the buck power stage during the transition.

The pulse width modulation generator 44 receives the output of the error amplifier and generates the current pulses used by the buck power regulator 46. The buck power regulator outputs the output voltage for the array Buck Regulator V out. This signal then goes to the array as its input voltage Array Voltage.

In the prior embodiment of FIG. 1, the voltage adjustment generally occurred once, performed by a technician at the time of manufacture. In the embodiments disclosed here, the adjustment of the voltage from the power stage to the array occurs in real time and throughout the life of the product. This means that the voltage adjustment is 'smart' as referred to in the title.

Figure 4A:
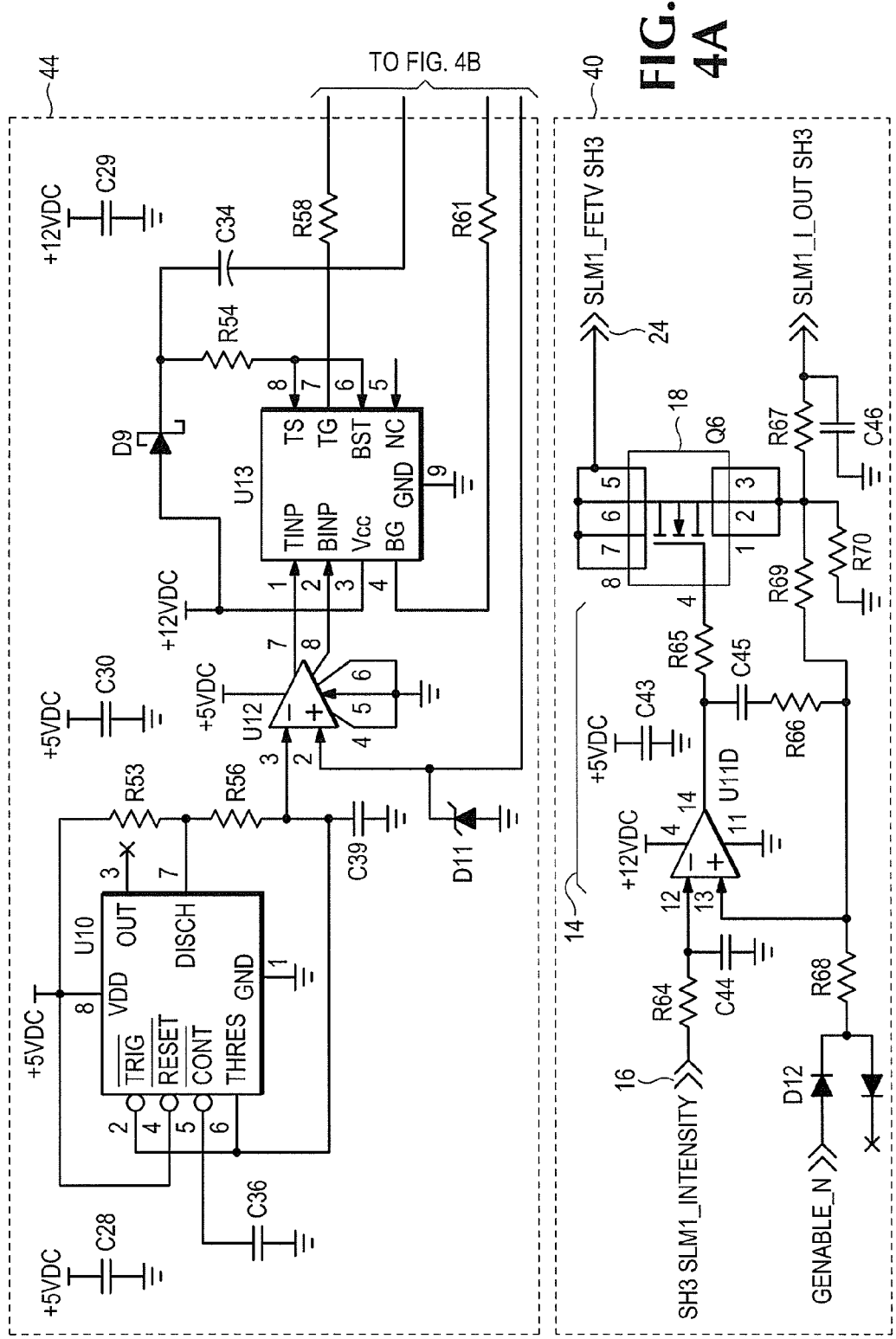
FIGS. 4A and 4B show a more detailed embodiment of a driving circuit for a solid state lighting device.
Figure 4B:
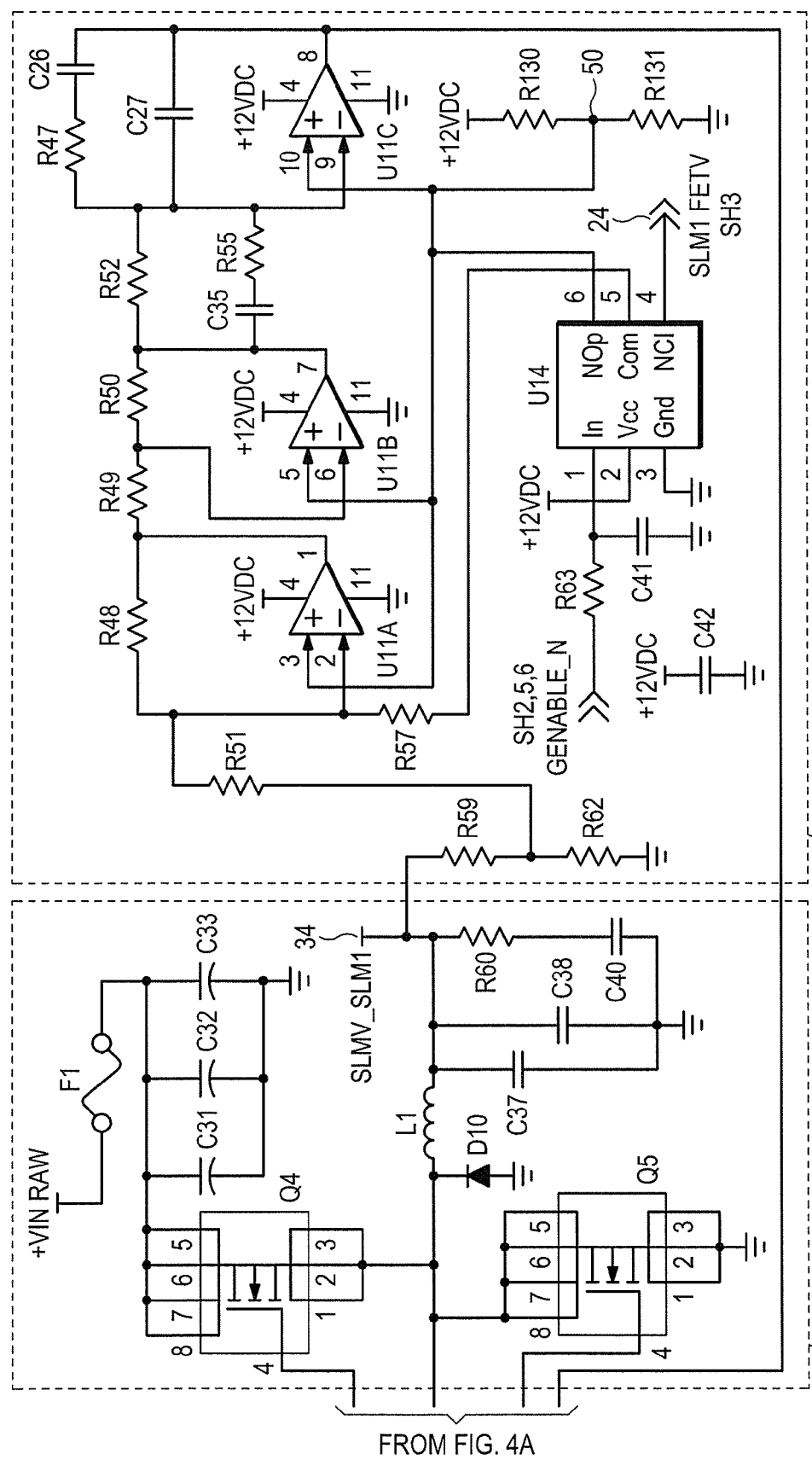

FIGS. 4A and 4B show an embodiment of one implementation of a driving circuit in accordance with the embodiments. The array stage 40 has the intensity control voltage 16, the variable resistor driver 14, the variable resistor that in this case is a FET, and the variable resistor output voltage 24. The error amplifier 42 also has the variable resistor output voltage 24 and the reference voltage 50. The pulse width modulation generator 44 feeds into the buck regulator stage or circuit 46. The buck regulator circuit then has as its output the voltage for the array 34. The actual array is not shown in this diagram.

One must note that the implementation of FIGS. 4A and 4B present merely one possible circuit in accordance with the embodiments discussed here. Many different implementations will provide a closed loop system that adjusts the voltage across a variable resistor to an appropriate level to drive an array of light-emitting elements. The implementation should also have low power dissipation and generate relatively low levels of heat.

Thus, although there has been described to this point a particular embodiment for a method and apparatus for a closed loop variable resistor drive circuit, it is not intended that such specific references be considered as limitations upon the scope of this invention except in-so-far as set forth in the following claims.

The invention claimed is:

1. A lighting module, comprising:
    at least one array of solid-state lighting elements;
    a variable resistor having an input of an intensity control voltage for the at least one array of solid-state lighting elements, the variable resistor electrically connected to the at least one array of solid-state lighting elements; and
    a voltage regulator electrically connected to the variable resistor, the voltage regulator having an output connected to an input of the at least one array of solid-state lighting elements, a first input electrically connected to the variable resistor, and a second input electrically directly connected to the output connected to the input of the array of solid-state lighting elements.

2. The lighting module of claim 1, wherein the variable resistor comprises one of a field-effect transistor, a bipolar transistor, and a digital potentiometer.

3. The lighting module of claim 1, wherein the voltage regulator comprises a buck regulator circuit.

4. The lighting module of claim 1, wherein the voltage regulator includes a power circuit, and where the power circuit is electrically connected to the second input.

5. The lighting module of claim 4, wherein the voltage regulator includes an error amplifier, and wherein the first and second inputs are inputs to the error amplifier.

6. The lighting module of claim 5, wherein the voltage regulator further comprises a switch arranged to indicate when the at least one array of solid-state light emitting elements is enabled.

7. The lighting module of claim 6, wherein the switch is arranged to electrically connect to a reference voltage when the at least one array of solid-state lighting elements is not enabled and to cause the error amplifier to only receive the output of the power circuit.

8. The lighting module of claim 6, wherein the switch is arranged to have a delay, the delay arranged to allow current in the at least one array of light-emitting elements to begin rising prior to receiving an output of the variable resistor.

9. A lighting module, comprising:
    at least one array of solid-state light-emitting elements;
    a field-effect transistor electrically connected to an intensity control voltage and the at least one array of solid-state light emitting elements; and
    a regulator circuit electrically connected to the field-effect transistor, the regulator circuit comprising:
        an error amplifier arranged to receive a signal from the field-effect transistor at a first input and an output of the regulator circuit directly supplied to a second input.

10. The lighting module of claim 9, wherein the regulator circuit further comprises a switch arranged to switch the first input of the error amplifier between the signal from the field-effect transistor and a reference voltage.

11. The lighting module of claim 10, wherein the switch includes a delay, the delay programmed with a time sufficient to allow current in the at least one array of light-emitting elements to rise prior to connecting the signal from the field-effect transistor to the error amplifier.

12. The lighting module of claim 9, wherein the error amplifier comprises a summing amplifier.

13. The lighting module of claim 9, wherein the regulator is a buck regulator.

14. The lighting module of claim 9, wherein the regulator circuit further comprises a pulse width modulation generator electrically connected to the error amplifier.

15. The lighting module of claim 14, wherein the regulator circuit further comprises a buck power stage electrically connected to the pulse width modulation generator, an output of the buck power stage electrically connected to the at least one array of solid state light emitting elements and the second input of the error amplifier.

* * * * *